United States Patent [19]

Obermeier

[11] Patent Number: 5,241,539
[45] Date of Patent: Aug. 31, 1993

[54] COMMUNICATION SYSTEM WITH SIGNAL CONVERTER BETWEEN NETWORKS

[75] Inventor: Siegfried Obermeier, Munich, Fed. Rep. of Germany

[73] Assignee: Siemens Aktiengesellschaft, Munich, Fed. Rep. of Germany

[21] Appl. No.: 776,244

[22] PCT Filed: Apr. 5, 1990

[86] PCT No.: PCT/DE90/00269
§ 371 Date: Dec. 3, 1991
§ 102(e) Date: Dec. 3, 1991

[87] PCT Pub. No.: WO90/13985
PCT Pub. Date: Nov. 15, 1990

[30] Foreign Application Priority Data

May 8, 1989 [DE] Fed. Rep. of Germany ....... 3915043

[51] Int. Cl.⁵ .............................................. H04J 3/22
[52] U.S. Cl. .................................... 370/79; 370/84
[58] Field of Search ............... 370/79, 84, 99, 110.1, 370/85.13, 85.14

[56] References Cited

U.S. PATENT DOCUMENTS 5,058,156 10/1991 Dietze .................... 370/84

FOREIGN PATENT DOCUMENTS 3033871 3/1982 Fed. Rep. of Germany .

OTHER PUBLICATIONS

"Application of ISDN To Interconnect Heterogeneous Switched Networks" by Najjar, IEEE Military Communications Conference Milcom 1986.
"Teilnehmersignalisierung (D-Kanal)" by Fundneider, Telcom Report Sonderheft, Diensteintegrierendes Digitalnetz ISDN, No. 8, Feb. 1985, pp. 26–30.

*Primary Examiner*—Douglas W. Olms
*Assistant Examiner*—Melvin Marcelo
*Attorney, Agent, or Firm*—Hill, Steadman & Simpson

[57] ABSTRACT

An information transmission system with a first user network in which pulse code modulation is used, with transition points connecting the networks. There are also signal preparation and data format adaptation devices in the terminals and in the transition point there is a source network recognition device by which a source network identification symbol is added to the call number from the other user network.

7 Claims, 5 Drawing Sheets

COMMUNICATION SYSTEM WITH SIGNAL CONVERTER BETWEEN NETWORKS

BACKGROUND OF THE INVENTION

The invention relates to a communication system according to the preamble of patent claim 1, and also to interfaces matched thereto.

A system of this type is known from German Offenlegungsschrift 3,033,871. This communication system consists of a first subscriber network in which the voice processing is executed with pulse code modulation and of a second subscriber network in which the voice processing is executed with delta modulation. The subscribers of the networks are connected to one another across an interface, with a signaling converter being provided in the interface. The subscriber terminals of the first network, which are equipped with a cryptogenerator, additionally have a delta modulation device corresponding to the second network for voice processing.

SUMMARY OF THE INVENTION

The object of the invention is to disclose a communication system or interfaces of the type mentioned at the beginning in which it is possible to connect networks having different bit rates in a simple manner.

This object is achieved according to the invention by a communication system, having a first subscriber network in which the subscriber terminals have a voice processing device employing pulse code modulation, having at least one further subscriber network in which the subscriber terminals have voice processing devices and in which the bit transmission rate is not greater than that in the first subscriber network, having at least one interface with signaling converter connecting the networks, having predetermined subscriber terminals of the first subscriber network, which additionally have a voice processing device in accordance with each of the further subscriber networks. The subscriber terminals have data format adaptation devices connected downstream of the additional voice processing devices. The interfaces have data format adaptation devices, and each of the interfaces has a source network identification device with which a source network identifier is appended to the call number from the further subscriber network, by means of which one of the additional voice processing and data format adaptation devices is switched on in the subscriber terminal of the first network. One of the interfaces has a data format adaptation device and a source network identification device, with which a source network identifier is appended to the call number from a further network, by means of which one of the additional voice processing and data format adaptation devices is switched on in the subscriber terminal of the first network. Another of the interfaces has a data format adaptation device and a modem for digital signal transmission in an analog network. A source network identification device is provided, with which a source network identifier is appended to the call number from the analog network, by means of which one of the additional voice processing and data format adaptation devices is switched on in the subscriber terminal of the first network.

A great advantage of the communication system according to the invention is that it is also possible to exchange encrypted messages between subscribers on different networks without the message appearing in the interface without encryption.

A further advantage is conferred by the fact that it is not necessary to alter the existing networks in the communication system according to the invention.

Likewise it is not necessary to alter any of the subscriber terminals in the corresponding networks (Eurocom network and IVSN Nato network).

An extension of the communication system according to the invention to further digital or analog networks is readily possible.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
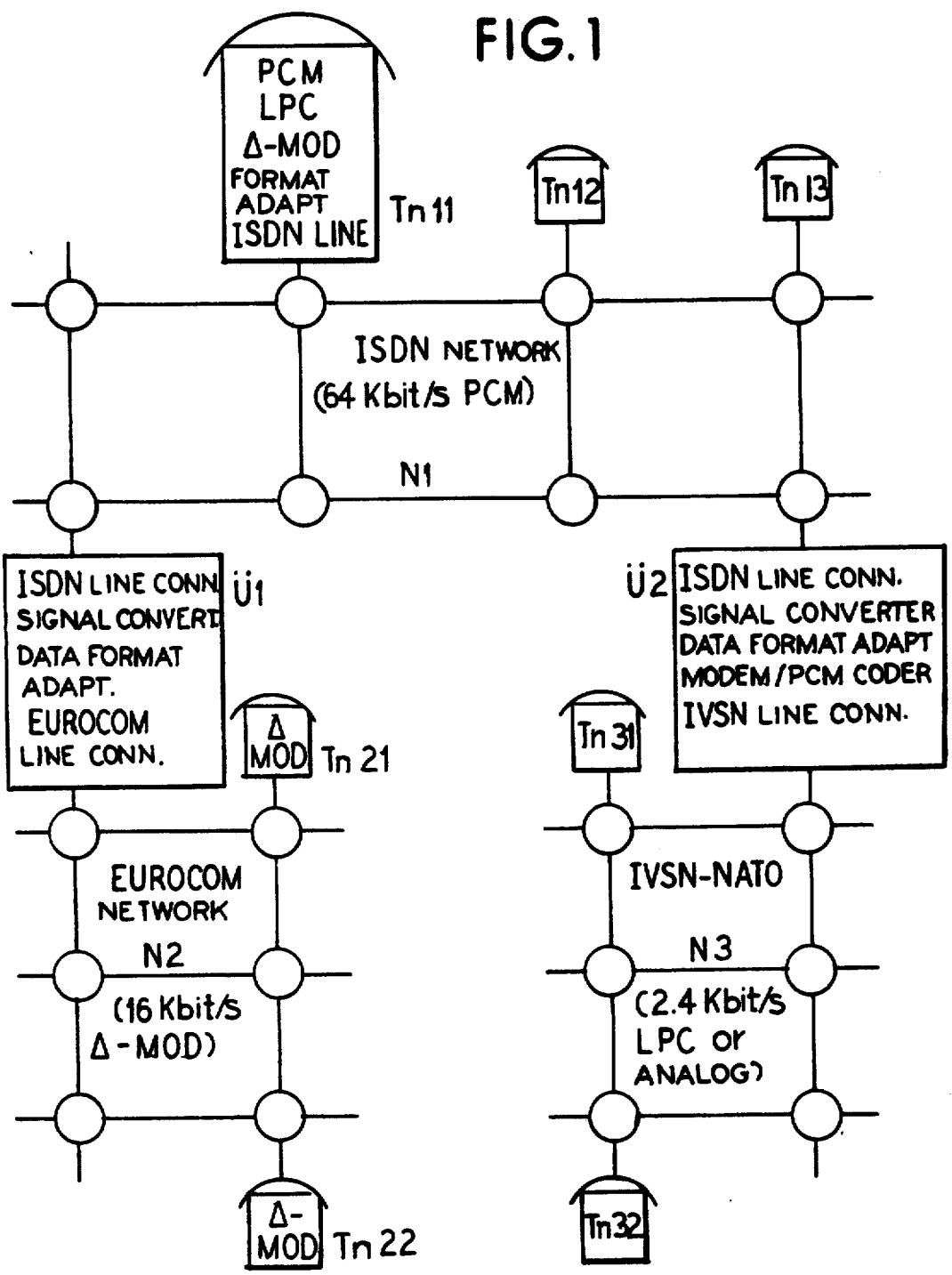
FIG. 1 shows a communication system consisting of three subscriber networks.

FIG. 1 illustrates three subscriber networks:

A first network N1, a so-called ISDN network, in which the data are transmitted at a bit rate of 64 kbits per second. For voice processing, that is to say for digitizing the analog voice signal or, in the opposite direction, for converting the incoming digital voice signal into an analog signal, pulse code modulation is employed in the subscriber terminals Tn11, 12, . . . .

A second network N2, a so-called Eurocom network, in which the data are transmitted at a bit rate of 16 kbits per second. Delta modulation is employed for voice processing in the subscriber terminals Tn21, 22.

A third network N3, a so-called IVSN Nato network. This is an analog network in which the voice signal is transmitted as an analog signal between the subscriber terminals Tn31, 32. If so-called vocoders are employed for voice processing in the subscriber terminals Tn31, 32, the digital voice signal is transmitted at a transmission rate of 2.4 kbits per second instead of the analog voice signal.

In all of the networks N1, N2, N3, the digital voice signals are normally transmitted without encryption, but they are also transmitted encrypted if cryptogenerators are employed in selected subscriber terminals.

Two interfaces Ü1, Ü2 are used to connect the networks N1 to N3. The first interface Ü1 is connected between the first N1 and the second network N2, and the second interface Ü2 is connected between the first network N1 and the third network N3. The interfaces Ü1 and Ü2 are explained more fully later with reference to FIGS. 4 and 5.

Figure 2:
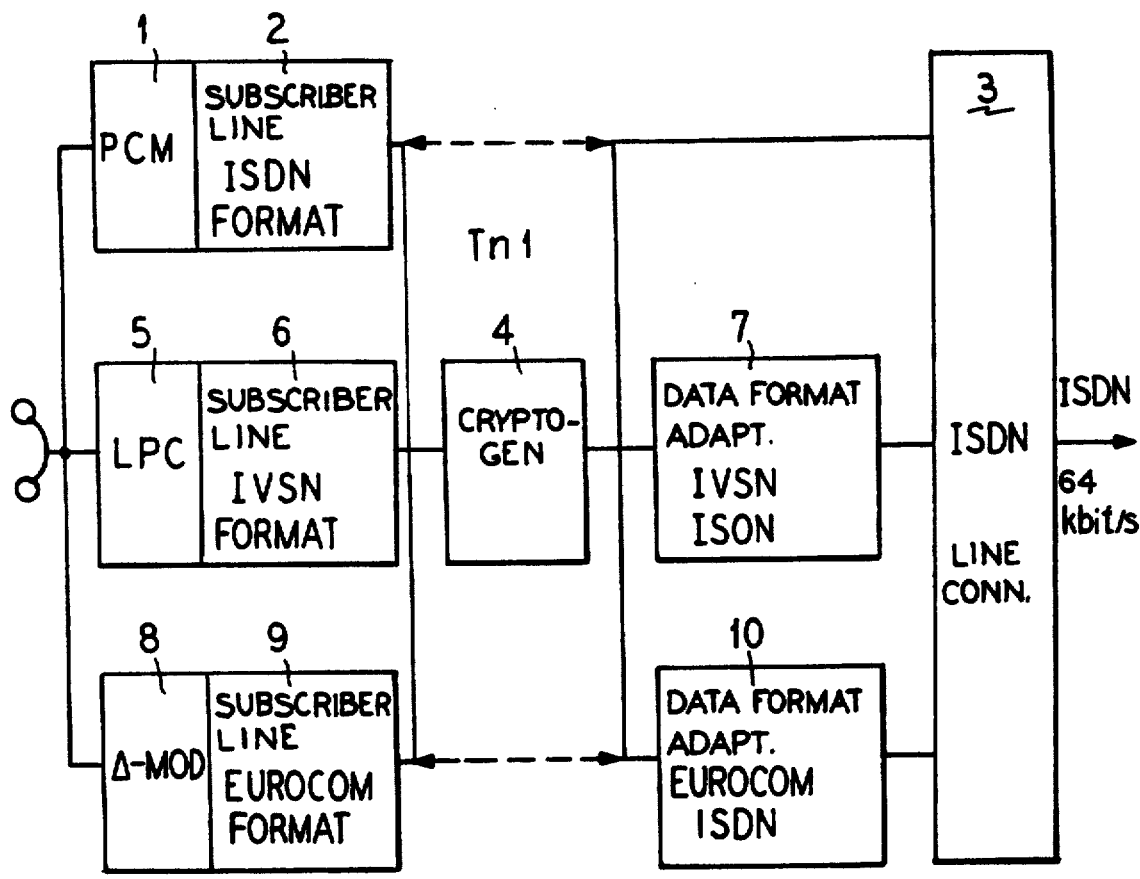
FIG. 2 shows the subscriber terminal according to the invention.

A subscriber terminal Tn1 for an ISDN network (first network N1) is illustrated in FIG. 2. It has here a voice processor 1 employing pulse code modulation, a subscriber line device 2 for the ISDN format, and a line terminating device 3 in accordance with the ISDN transmission protocol. In addition, the subscriber terminal Tn1 contains a cryptogenerator 4 for encrypting the digital voice signal.

According to the invention, the subscriber terminal Tn1 has additional devices matched to the second network (N2) (Eurocom network). These are a voice processing device 8 employing delta modulation (16 kbit/sec), a subscriber line device 9 in accordance with the Eurocom format, and also a data format adaptation device 10 for converting the voice signal digitized according to the Eurocom format into a voice signal digitized according to the ISDN protocol.

According to the invention, the subscriber terminal Tn1 has further additional devices matched to the third network N3 (IVSN Nato network). These are an LPC vocoder 5 (2.4 kbit/sec) for voice processing, a subscriber line device 6 for matching to the IVSN format, and also a data format adaptation device 7 for converting the voice signal digitized according to the IVSN protocol into a voice signal digitized according to the ISDN protocol.

The analog voice signal is thus digitized with three different methods in the subscriber terminal Tn1 and output to the first network N1. The one of the voice processing devices 1, 5, 8 corresponding to the network where the called subscriber is located is always switched on here. Likewise, each of the voice signals can be encrypted using the cryptogenerator 4. The bit rate of the cryptogenerator 4 is matched to the bit rate of the voice processing device 1, 5, 8 that is switched on and is connected directly downstream of the voice digitizer (delta modulator 8, LPC vocoder 5) with associated subscriber line device 6, 9.

Figure 3:
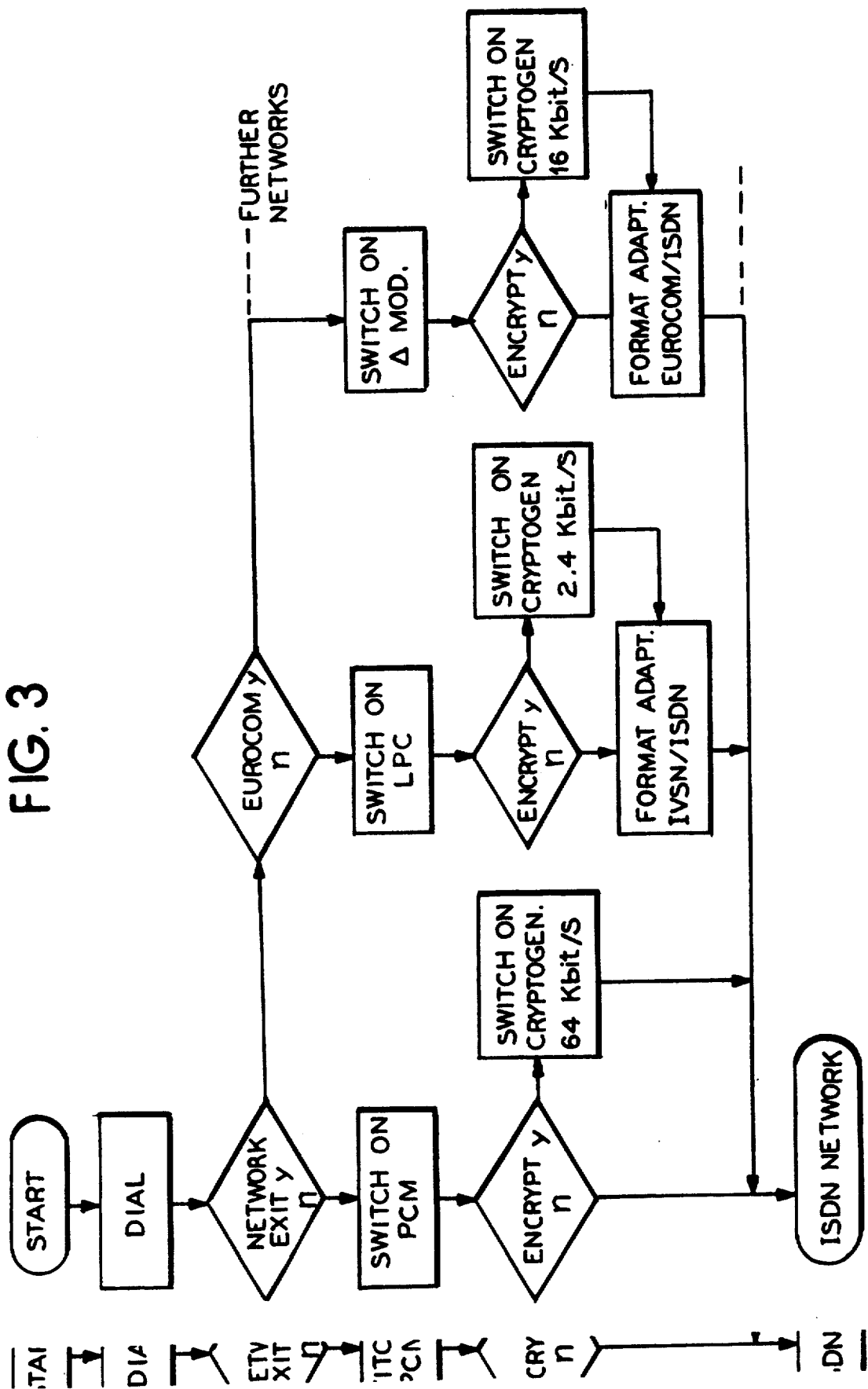
FIG. 3 shows a flowchart for explaining how the subscriber terminal functions.

Such a connection establishment is described below with reference to FIG. 3.

To start with, the receiver is usually lifted and a number is dialled to establish a connection between one subscriber in the first network N1 and the called subscriber. This dialling also entails a network exit in the case of a subscriber located outside the network.

If the dialling does not entail a network exit (network exit n), the voice processing device 2 employing pulse code modulation is switched on, the cryptogenerator 4 may be connected if desired, and the conversation between the two subscribers takes place.

If the dialling does entail a network exit (network exit y), in one case the connection is established to the second network N2 (Eurocom network) to the subscriber there (Eurocom y) via the transition point Ü1. The voice processing device 8 employing delta modulation is switched on in the subscriber terminal Tn1, the cryptogenerator 4 (matched to 16 kbit/sec) may be connected if desired, and the Eurocom/ISDN format adaptation device 10 is activated. If the dialling entails a network exit (via the second interface Ü2) to the third network N3 (Eurocom n), then the LPC vocoder 5 is switched on in the subscriber terminal Tn1 for voice processing, if necessary the cryptogenerator 4 (matched to 2.4 kbit/sec) is connected, and the IVSN/ISDN format adaptation device is activated.

According to the invention, therefore, quite normal voice signals (non-encrypted or encrypted text) digitized and formatted in accordance with the ISDN network are transmitted in the first network N1. Moreover, so-called pseudo-ISDN messages are also transmitted in this ISDN network. These are the analog voice signals processed with a vocoder or in accordance with the delta modulation method, which were converted using the data adaptation devices 7, 10 into the ISDN format and are transmitted in the first network 1 like normal ISDN signals.

The establishment of the connection between a calling subscriber in one of the networks N2, N3 and a called subscriber in the first network N1 will be discussed later.

Figure 4:
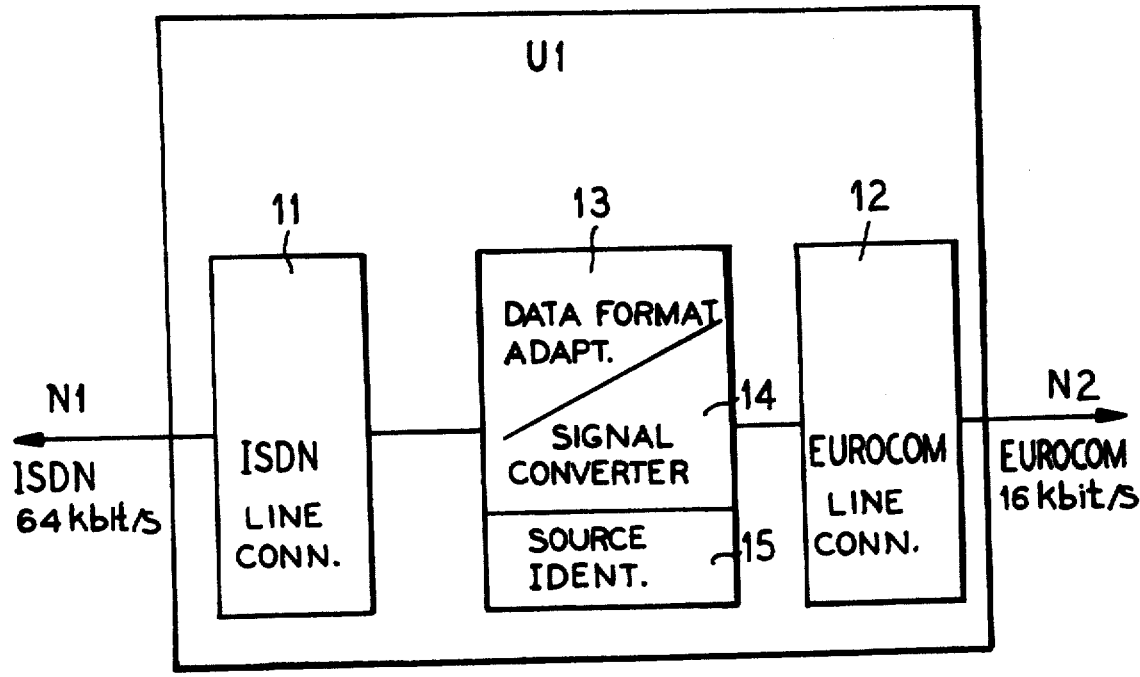
FIG. 4 shows the interface according to the invention between PCM and delta-modulated network.

The interface Ü1 is illustrated as a block circuit diagram in FIG. 4. On the side facing the first network N1 it contains a line terminating device 11 in accordance with the ISDN format, and on the side facing the second network N2 it contains a line terminating device 12 in accordance with the Eurocom format. According to the invention, a data format adaptation device 13 for converting these two data formats and a signaling converter 14 for converting the signaling data (call number, busy and free tones, etc.) are connected in between.

Furthermore, a source network identification device 15 is provided in the interface Ü1. In this source network identification device 15, in the event of signaling from the second network N2, a source network identifier is appended to the normal call number (the called subscriber is located in this case in the first network N1). By means of this source network identifier, the voice processing and formatting path (8, 9, 10) corresponding to the second network N2 is switched on in the subscriber terminal Tn1 of the called subscriber.

Figure 5:
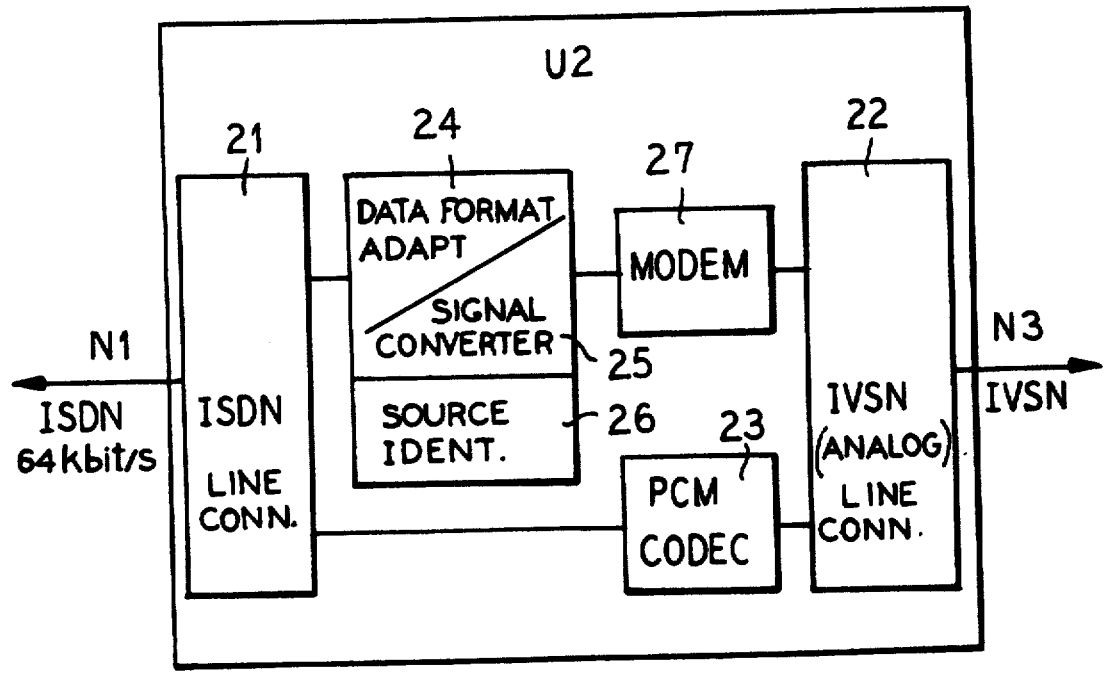
FIG. 5 shows the transition point according to the invention between PCM and analog network.

FIG. 5 illustrates the second interface Ü2. On the side facing the first network N1 it contains a line terminating device 21 in accordance with the ISDN format, and on the side facing the analog third network N3 it contains a line terminating device 22 in accordance with the IVSN format.

A PCM codec 23 (coder-decoder) is connected between these two line terminating devices 21, 22 for unencrypted voice transmission. Analog voice signals from the third network N3 are digitized in the PCM codec 23 with the pulse code modulation method, and digital voice signals from the first network N1 are converted into the analog voice signal.

As already explained with reference to FIG. 1, it is also possible to transmit digital voice signals, in particular encrypted digital voice signals, in the analog network N3. For this purpose, according to the invention a data format adaptation device 24, a signaling converter 25, and downstream of these last two a modem 27 are inserted between the two line terminating devices 21, 22. In this arrangement, the digital voice signals of the first network N1 and of the third network N3 are converted in the data format adaptation device 24 together with the modem 27. The signaling converter 25 likewise serves together with the modem 27 to convert the signaling used in the first network N1 and in the third network N3.

Moreover, a source network identification device 26 is also provided here, by means of which a source network identifier is appended in the case of a call from the third network N3 (the called subscriber is located in the first network N1) to this call number. As a result of this source network identifier, the voice processing and formatting path (5, 6, 7) corresponding to the third network N3 is connected in the subscriber terminal.

Figure 6:
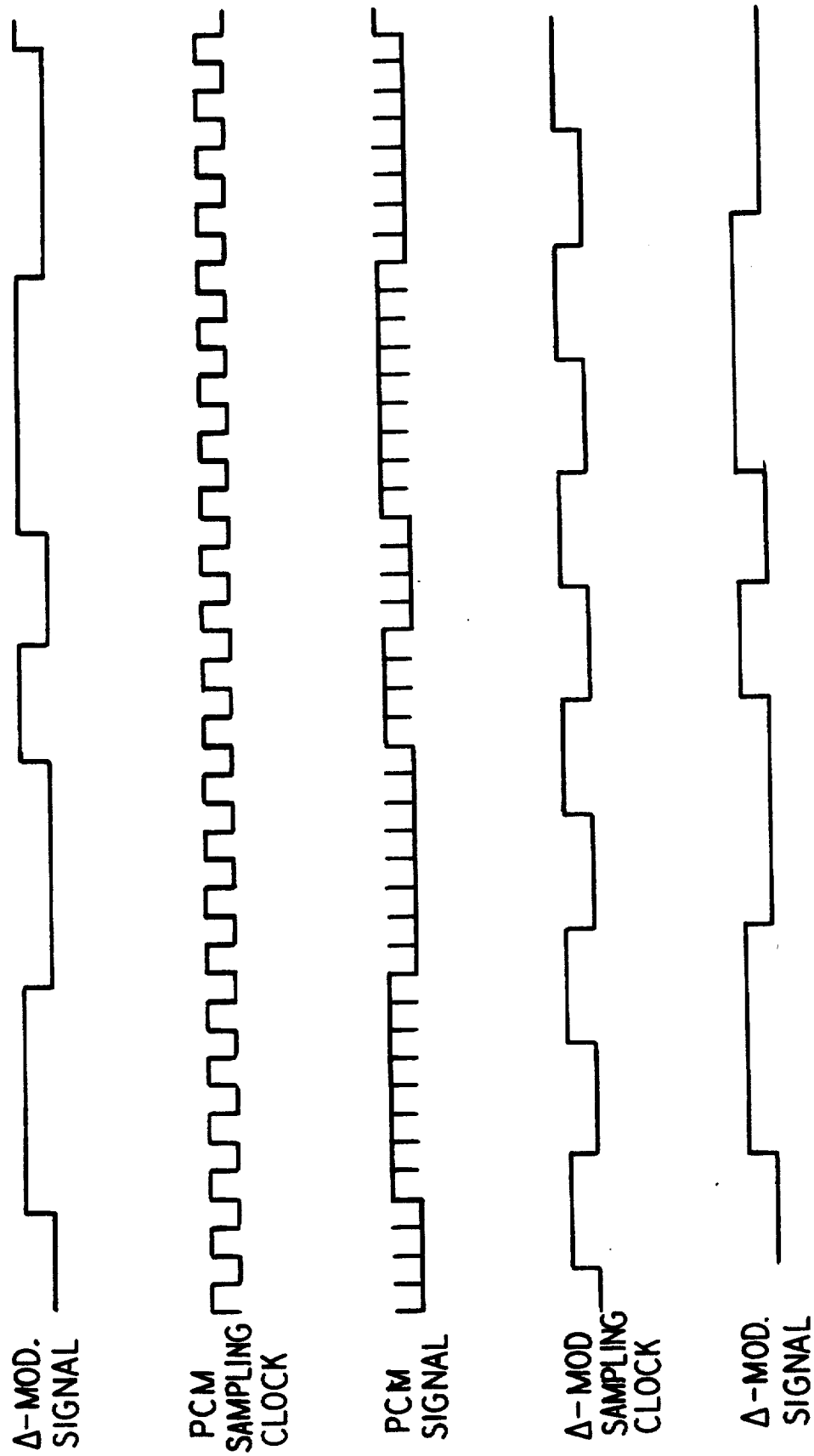
FIG. 6 shows a pulse diagram for explaining the transmission method in the PCM network.

It is described with reference to FIG. 6 how a delta-modulated voice signal is converted into a PCM-modulated voice signal in the data format adaptation device 7 of the subscriber terminal Tn1, FIG. 2 (or in the data formatting device 13 in the interface Ü1, FIG. 4), and converted back from this into a delta-modulated voice signal. For this purpose, the delta-modulated voice signal is sampled with the PCM sampling clock, and a so-called pseudo-PCM signal is formed. In the line terminating device 3 of the subscriber terminal Tn1 (or in the line terminating device 11 in the interface Ü1, FIG. 4), this pseudo-PCM signal is handled and formatted exactly like a conventional PCM voice signal.

In the data format adaptation device 13 of the interface Ü1, FIG. 4 (or in the data format adaptation device 7 of the subscriber terminal Tn1, FIG. 2), this pseudo-PCM signal is sampled with the sampling clock corresponding to the delta modulation method, and the delta-modulated signal is recovered, as can be seen in the drawing, with a time offset. This delta-modulated signal is then output to the second network N2 (or to the subscriber line device 6, FIG. 2) via the line terminating device 12.

The same procedure—conversion of the delta modulated signal into a pseudo-PCM signal and the recovery of the delta-modulated signal—is executed in the data format adaptation device 13 of the interface Ü1 when the digital voice signal is forwarded from the second network N2 into the first network N1.

The conversions in the second interface Ü2, or in the signal processing path of the subscriber terminal corresponding to the third network N3, are executed analogously.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication system comprising: a first subscriber network in which subscriber terminals have a voice processing device employing pulse code modulation; at least one further subscriber network in which subscriber terminals have voice processing devices and in which a bit transmission rate is not greater than a bit transmission rate in the first subscriber network; at least one interface with signaling converter connecting the networks; predetermined subscriber terminals of the first subscriber network having at least one additional voice processing device in accordance with the at least one further subscriber network; the predetermined subscriber terminals having data format adaptation devices connected downstream of the additional voice processing devices; each of the interfaces having data format adaptation devices; each of the interfaces having a source network identification device with which a source network identifier is appended to a call number from the further subscriber network, by means of which one of the additional voice processing and data format adaptation devices is switched on in the respective predetermined subscriber terminal of the first network.

2. The communication system according to claim 1, wherein the voice processing device of one of the further subscriber networks has a means for delta modulation.

3. The communication system according to claim 1, wherein the further network is an analog network, wherein the subscriber terminals of the first network additionally have a vocoder that can be switched on for voice digitization and a data format adaptation device, at least one of the subscriber terminals in the analog network having a vocoder that can be switched on, wherein the interface has a modem, a data format adaptation device and a source network identifier is appended to the call number from the analog subscriber network, by means of which the additional voice processing and data format adaptation device is switched on in the subscriber terminal of the first network.

4. The communication system according to claim 1, wherein predetermined subscriber terminals of each of the connected subscriber networks have a cryptogenerator, wherein the cryptogenerator in the subscriber terminals of the first network has a variable bit rate that can be matched to different bit rates of the voice processing devices and is connected directly downstream thereof.

5. The communication system according to claim 1, wherein the interface has a data format adaptation device and a source network identification device, with which a source network identifier is appended to a call number from the further subscriber network, by means of which one of the additional voice processing and data format adaptation devices is switched on in the subscriber terminal of the first network.

6. The communication system according to claim 1, wherein the interface has a data format adaptation device and a modem for digital signal transmission in an analog network and a source network identification device, with which a source network identifier is appended to a call number from the analog network, by means of which one of the additional voice processing and data format adaptation devices is switched on in the subscriber terminal of the first network.

7. The communication system according to claim 6, wherein the interface has a PCM codec for digitizing analog signals and for converting digital signals into analog signals.

* * * * *